(No Model.)
A. J. LANDRY.
EYEGLASSES.
No. 493,169. Patented Mar. 7, 1893.
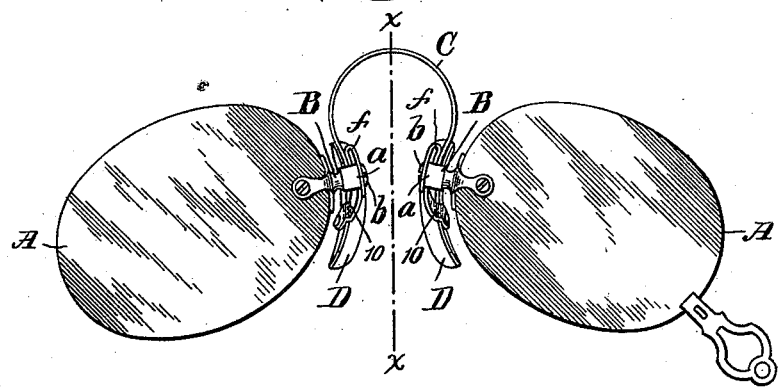
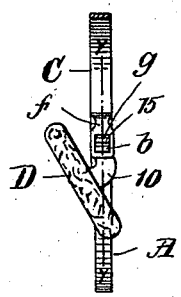 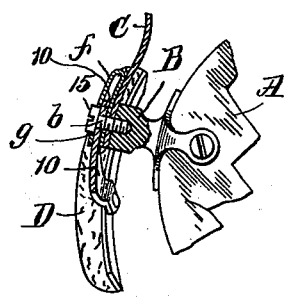 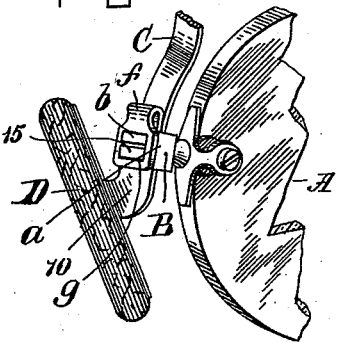
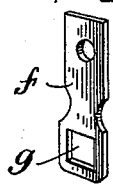 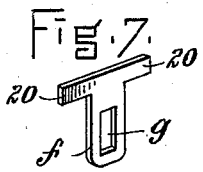 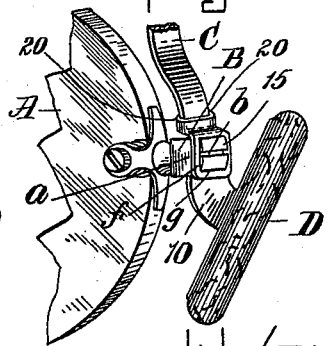
WITNESSES.
R. Henry Marsh.
Harry H. Aiken.
INVENTOR.
Adolphus J. Landry
by F. A. Teschemacher
Atty
THE NORRIS PETERS CO., PHOTO-LITHO., WASHINGTON, D. C.

UNITED STATES PATENT OFFICE.

ADOLPHUS J. LANDRY, OF SOMERVILLE, MASSACHUSETTS.

EYEGLASSES.

SPECIFICATION forming part of Letters Patent No. 493,169, dated March 7, 1893.

Application filed December 19, 1892. Serial No. 455,692. (No model.)

*To all whom it may concern:*

Be it known that I, ADOLPHUS J. LANDRY, a citizen of the United States, residing at Somerville, in the county of Middlesex and State of Massachusetts, have invented certain Improvements in Eyeglasses, of which the following is a full, clear, and exact description, reference being had to the accompanying drawings, making part of this specification, in which—

Figure 1 is a front view of a pair of eyeglasses embodying my invention. Fig. 2 is a section on the line $x\ x$ of Fig. 1, showing the inner end of one of the lenses and the parts connected therewith. Fig. 3 is an enlarged vertical section through one of the lens-posts and parts connected therewith on the line $y.\ y.$ of Fig. 2. Fig. 4 is a perspective view illustrating the construction of the locking device by which the screw which holds the bow-spring and nose-guard to the lens post, is prevented from turning when in place. Fig. 5 is a view of the locking plate detached. Fig. 6 is a view illustrating a modification to be referred to. Fig. 7 is a view of the locking plate shown in Fig. 6.

In eyeglasses of ordinary construction, the screws by which the ends of the lens-connecting bow-spring and the nose-guards are secured to the lens-posts frequently become loosened and fall out; much inconvenience and annoyance being thereby occasioned to the wearer of the glasses.

To obviate this difficulty is the object of my invention, which consists in providing the screw by which the bow-spring or other device for connecting the lenses or lens frames, and the nose-guards, or either of them are secured to the lens-post, with a polygonal head, and combining therewith a locking plate secured to an adjacent portion of the eyeglass, and provided with a slot or aperture shaped to fit said screw head, over which it is placed to prevent the screw from turning, as hereinafter more particularly set forth.

In the said drawings, A, A, represent the lenses of an eyeglass, to which are secured in the usual manner the lens-posts or studs B, B, which are channeled at their outer ends or provided with side flanges $a, a$, between which the extremities of the connecting bow-spring C and the arms 10 of the nose-guards D are seated and secured by screws $b, b$, each of which is provided with a polygonal head 15, preferably square. These screws pass as usual through holes in the ends of the bow-spring C and nose-guard arms 10, and enter threaded axial apertures in the lens-posts B.

To each post B is secured a locking plate $f$, composed of thin sheet metal, one end of which is clamped between the end of the bow-spring and the nose-guard arm 10 by the screw $b$, which passes therethrough. This locking plate is provided with an aperture $g$ shaped to fit the head 15 of the screw $b$, and after said screw has been turned into place the locking plate is bent down over the head 15, as shown in Figs. 1, 2, 3, and 4, thereby locking the screw $b$ and effectually preventing it from becoming loose and dropping out as heretofore liable to occur, whereby much inconvenience and annoyance are avoided, especially in cases where opportunities for repairs are not at hand.

In Fig. 6 is represented a modification of my invention, in which the locking plate $f$, instead of being clamped between the end of the bow-spring C and the arm 10 of the nose-guard, is provided with lateral arms 20 at its upper end, which are adapted to be bent around the bow-spring C immediately above the lens-post, as shown, or around any other convenient adjacent portion of the eyeglass, whereby said locking plate after being placed over the head of the screw, is securely held in place as required.

It is obvious that my locking plates may be used in connection with the screws $b$ in cases where the nose-guards are dispensed with, or where said screws $b$ are employed for securing to the lens-posts any suitable device or means for connecting the lenses or lens-frames, or wherever screws are employed for connecting different portions of an eyeglass frame.

What I claim as my invention, and desire to secure by Letters Patent, is—

1. In eyeglasses, the combination, with the lens-post, a connecting device for the lenses, and the fastening screw, the latter having a polygonal head, of a locking-plate secured to an adjacent portion of the eyeglass and having an aperture or slot shaped to fit said screw head; said locking plate being placed thereover to prevent the screw from turning or becoming loose, substantially as set forth.

2. In eyeglasses, the combination, with the lens-post, the bow-spring, and the screw for securing said spring to the lens-post, said screw having a polygonal head, of the locking-plate $f$ secured to an adjacent portion of the eyeglass and having a slot or aperture shaped to fit said screw head and adapted to be placed thereover after the screw has been turned into place, substantially as and for the purpose specified.

3. In eyeglasses, the combination, with the lens-post, the bow-spring, the nose-guard, and the screw for securing said spring and nose-guard to the lens-post, said screw having a polygonal head, of the locking plate $f$ secured to an adjacent portion of the eyeglass and having a slot or aperture $g$ shaped to fit said screw-head and adapted to be placed thereover after the screw has been turned into place, substantially as and for the purpose specified.

4. In eyeglasses, the combination, with the lens-post, a connecting device for the lenses, and a fastening screw $b$, the latter having a polygonal head, of a locking plate provided with lateral arms or projections 20 adapted to be bent around an adjacent portion of the eyeglass, and having an aperture or slot shaped to fit said screw head, said locking plate being placed thereover to prevent the screw from turning or becoming loose, substantially as described.

Witness my hand this 14th day of December, A. D. 1892.

ADOLPHUS J. LANDRY.

In presence of—
  P. E. TESCHEMACHER,
  HARRY W. AIKEN.